Oct. 16, 1951 W. A. STRINGER 2,571,392
GOLF CLUB CARRIER

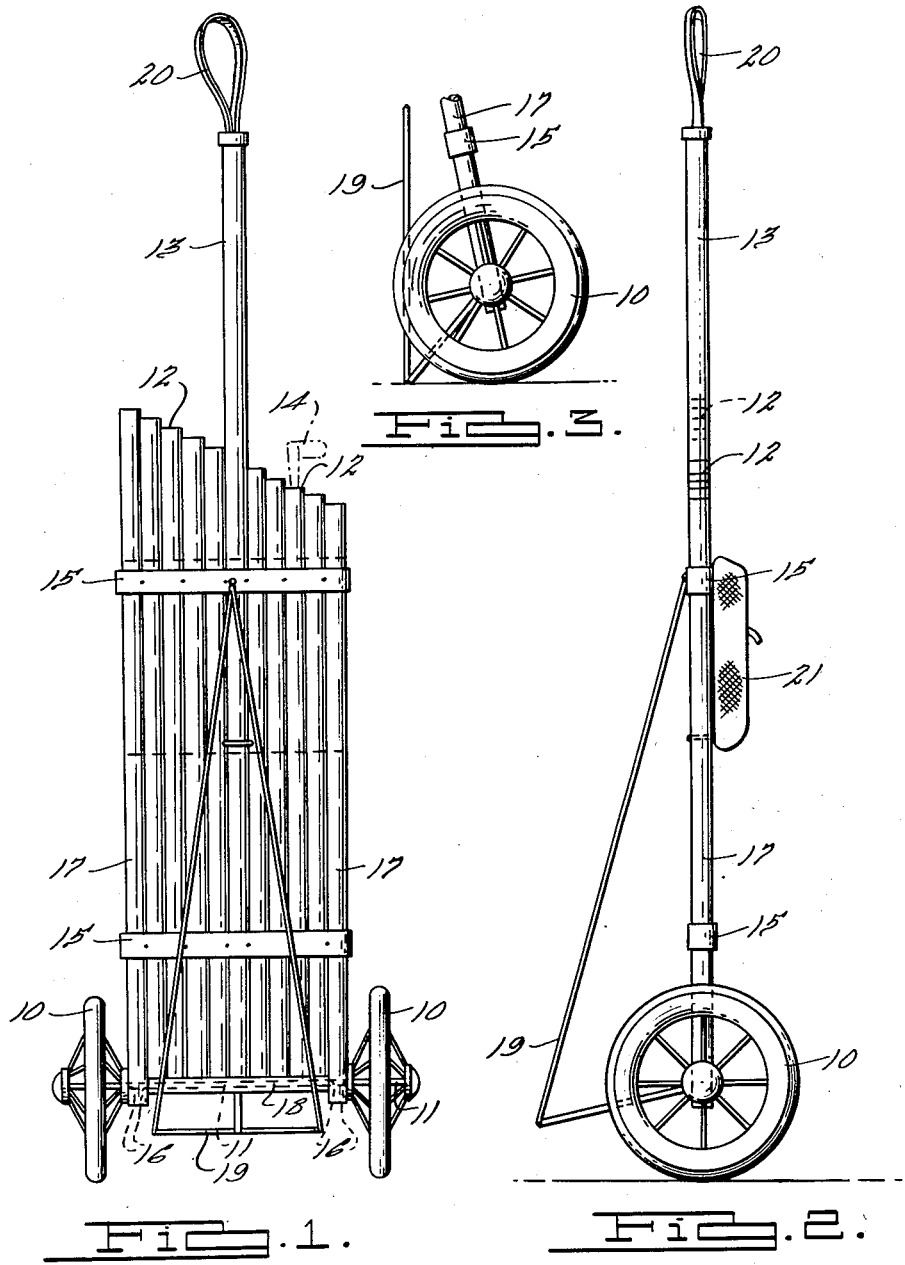

Filed Oct. 19, 1949 2 Sheets-Sheet 2

INVENTOR.
Watson A. Stringer.
BY
Harness, Dickey & Pierce.
ATTORNEYS.

Patented Oct. 16, 1951

2,571,392

UNITED STATES PATENT OFFICE 2,571,392

GOLF CLUB CARRIER

Watson Alfred Stringer, Pontiac, Mich.

Application October 19, 1949, Serial No. 122,339

2 Claims. (Cl. 280—51)

It is an object of this invention to provide a novel cart for carrying golf clubs.

It is a further object to provide such a cart which can be transported conveniently in an automobile.

It is a further object to provide in such a cart means for the storage of golf clubs thus eliminating the need for a golf bag.

I have now found that the foregoing and related objects can be secured in a cart comprising, in addition to the two wheels and axle normally present, a row of tubes supported on said axle and a handle positioned parallel to and in the plane of said tubes. In a preferred embodiment of the invention the row of tubes lies in the plane of the axle and the axle is made to traverse the lower end of each of the end tubes. Similarly, a preferred embodiment of the invention includes a stand to permit the cart to remain upright when at rest, the stand preferably extending outwardly from the tube assembly to a point which lies within a line which joins the peripheries of the wheels. Also included in preferred embodiments of the invention is a sleeve to enclose the axle and to provide a rest for the ends of the golf clubs.

Other objects and features of novelty of the invention will be specifically pointed out or will become apparent when referring, for a better understanding of the invention, to the following description taken in conjunction with the accompanying drawings, wherein:

Fig. 1 is a view of a cart for carrying golf clubs and embodying features of the present invention;

Fig. 2 is a side view of the structure shown in Fig. 1;

Fig. 3 is a fragmentary side view illustrating the use of a stand which does not project beyond the periphery of the wheel;

Figure 4:
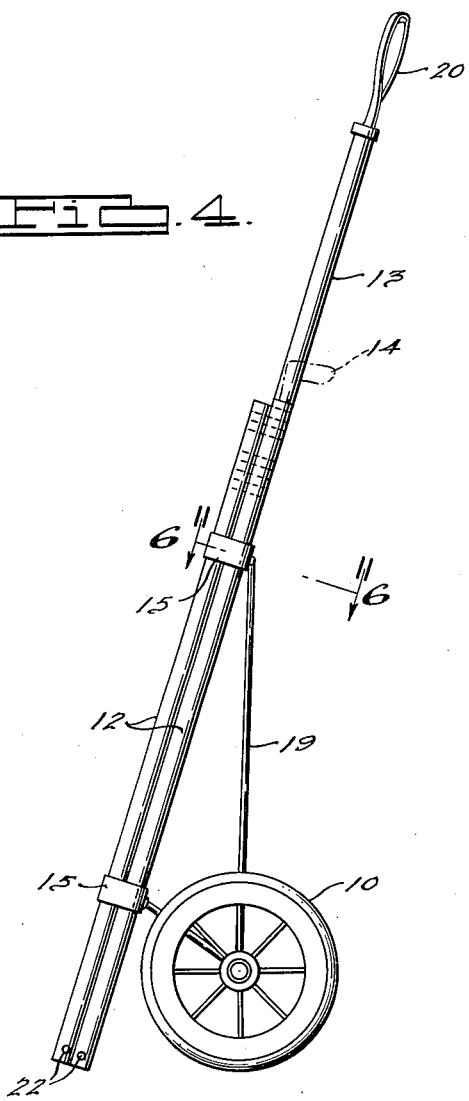
Fig. 4 illustrates an alternative embodiment of the invention in which the positions of the row of tubes and stand of Figs. 1 and 2 are reversed with respect to the axle.

Referring more particularly to the drawings:

The cart as shown, consists generally of wheels 10, an axle 11, tubes 12, and a handle 13. The tubes 12 which are adapted to hold a golf club 14, may be formed from any suitable material such as metal, plastic or the like and are positioned to lie in a common plane with the axle 11. The tube assembly is enclosed in bands 15 to make a rigid structure.

Holes 16 are provided at the lower end of the end tubes 17 of the tube assembly and the axle 11 is passed transversely therethrough. This provides a very secure attachment for the tube assembly to the axle and additional frame work is not required. It is preferred that the axle 11 be enclosed in a protective sleeve 18 to prevent damage to the club handles. The clubs are carried in the tubes 12 and the end of the handles may rest on the protective sleeve 18 of the axle or on the axle itself.

Various auxiliary structures may be provided for added convenience in the use of the cart of the invention. A stand 19 may be provided to hold the cart in an upright position when the cart is at rest. In a preferred embodiment of the invention the stand does not extend beyond the periphery of the wheels 10. In this manner the depth of the structure is determined by the diameter of the wheels and maximum convenience is obtained when transporting the cart in an automobile. A hand grip 20 may be attached to the end of the handle 13 and a pouch 21 may be secured to the band 15. The pouch 21 may be used for carrying golf tees or golf balls or may be large enough to carry shoes or the like.

Figure 5:
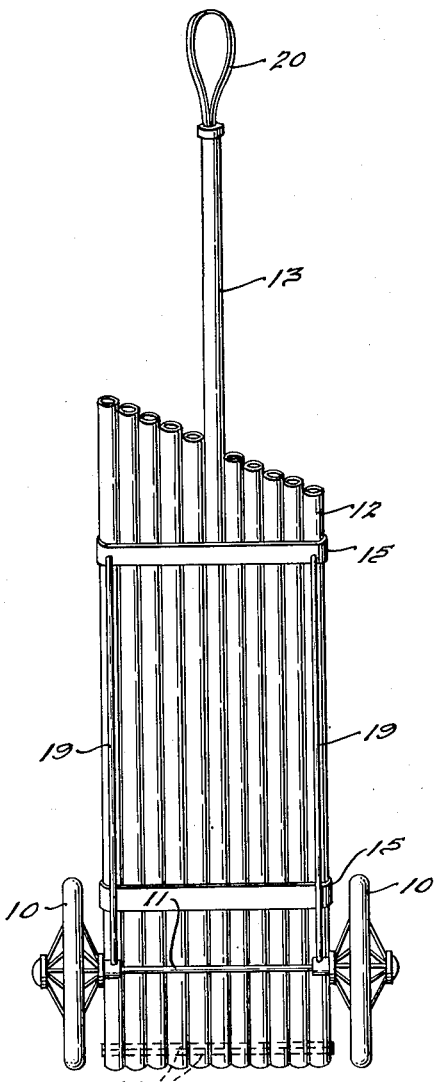
Fig. 5 is a plan view of the structure of Fig. 4.
Figure 6:
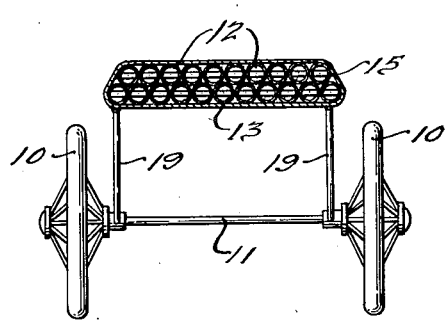
Fig. 6 is a view of the structure of Fig. 4 taken along the line 6—6.

In the embodiment of the invention illustrated in Figures 4, 5, and 6 the tubes 12 are staggered to form a closely packed row. In this connection the word "row" is used herein to mean a substantially uniplanar arrangement of tubes, importance being placed on compactness transversely. The word "row" is not limited to the case wherein the centers of all tubes are in a straight line.

In the embodiment of Figures 4, 5, and 6 the support 19 rests on the axle and the tubes 12 extend outwardly to serve as a stand as well as club holders. Pins 22 extend through the lower ends of the tubes and serve as a support for the end of the club handles.

It will be apparent that this latter embodiment likewise can be constructed to bring the lower end of the tubes to a point within the periphery of the wheels so as to limit the depth of the structure.

The golf cart of the invention may be used for the permanent storage of golf clubs thus eliminating the necessity of owning both a golf bag and a cart. The cart may be transported conveniently in pleasure cars because of its substantial uniplanar structure. As indicated previously, such a structure permits the overall depth of the lower portion of the cart to be limited substantially to the diameter of the wheels and the depth of the upper portion to be limited to the diameter of a relatively narrow row of tubes which is not substantially wider than the handle of a golf club.

I claim:

1. In a cart for carrying golf clubs comprising two wheels and an axle joining said wheels the improvement which comprises a row of tubes supported on and positioned in a common plane with said axle; end tubes positioned at the ends of said row and being provided with oppositely disposed holes transverse of the axis of said tubes; and a handle for pushing said cart positioned parallel to and in the plane of said tubes, wherein each of said tubes is adapted to serve as a receptacle for a golf club and wherein each of the end tubes extends below said axle and are traversed by said axle, said axle extending through said oppositely disposed holes.

2. In a cart for carrying golf clubs comprising two wheels and an axle joining said wheels the improvement which comprises a sleeve enclosing said axle; a row of tubes supported on and positioned in a common plane with said axle; end tubes positioned at the ends of said row and being provided with oppositely disposed holes transverse of the axis of said tubes; and a handle for pushing said cart positioned parallel to and in the plane of said tubes, wherein each of said tubes is adapted to serve as a receptacle for a golf club and wherein each of the end tubes extends below said axle and is traversed by said axle through said oppositely disposed holes.

WATSON ALFRED STRINGER.

REFERENCES CITED

The following references are of record in the file of this patent:

UNITED STATES PATENTS

| Number | Name | Date |
| --- | --- | --- |
| 1,486,655 | Gourley | Mar. 11, 1924 |
| 1,563,816 | Worthington | Dec. 1, 1925 |
| 1,581,061 | Johnston | Apr. 13, 1926 |
| 1,951,492 | Schneider | Mar. 20, 1934 |